United States Patent [19]

King

[11] 4,250,910
[45] Feb. 17, 1981

[54] IN-LINE APPARATUS FOR DISSOLVING A SOLID IN A LIQUID

[75] Inventor: Robert C. King, Irving, Tex.

[73] Assignee: Holiday Industries, Inc., Grand Prairie, Tex.

[21] Appl. No.: 938,415

[22] Filed: Aug. 31, 1978

[51] Int. Cl.³ .............................................. E03B 11/00
[52] U.S. Cl. ..................................... 137/268; 422/261
[58] Field of Search ........................... 137/268, 205.5; 422/264, 264 B, 283, 261, 262

[56] References Cited

U.S. PATENT DOCUMENTS

| | | | |
|---|---|---|---|
| 618,349 | 1/1899 | Heany | 137/205.5 X |
| 817,100 | 4/1906 | Bergman | 220/284 X |
| 846,100 | 3/1907 | Estap | 137/205.5 X |
| 1,150,596 | 8/1915 | Hollingshead | 220/284 X |
| 2,738,323 | 3/1956 | Tepas | 137/268 X |
| 2,889,995 | 6/1959 | Borell | 137/205.5 X |
| 3,195,558 | 7/1965 | Klueber | 137/268 X |
| 3,612,080 | 10/1971 | Schneider | 137/268 X |

*Primary Examiner*—Alan Cohan
*Attorney, Agent, or Firm*—W. Thomas Timmons

[57] ABSTRACT

An apparatus for dissolving a solid in a liquid flowing in a liquid line is disclosed. The apparatus includes a tank for holding the solid to be dissolved, an intake line for bringing liquid from the liquid line into the tank, and a return line for returning the liquid from the tank into the liquid line. In one arrangement, the return line is inserted an adjustable depth into the tank allowing adjustment of the water flow across the solid to be dissolved within the tank. An intake connector terminates the liquid line end of the intake line. The intake connector extends into the liquid line and forms an opening facing upstream in the liquid line. A return connector terminates the liquid line end of the return line. The return connector extends into the fluid line and forms an opening facing downstream in the liquid line. A hand operable valve and a flow meter are connected in-line with the intake line. The tank end of the intake line extends downwardly into the tank and is encircled by a substantially vertical pipe which rests on the bottom of the tank. The wall of the intake line forms at least one hole below the top of the encircling pipe for venting air from the line. In an arrangement especially suited for being a swimming pool chlorinator, a removable substantially vertical cartridge pipe with a plurality of apertures along its length rests on the bottom of the tank for retaining chlorine tablets. A special lid including a groove for receiving a tool shaft across the top of the lid engages a threaded aperture above the cartridge pipe.

9 Claims, 5 Drawing Figures

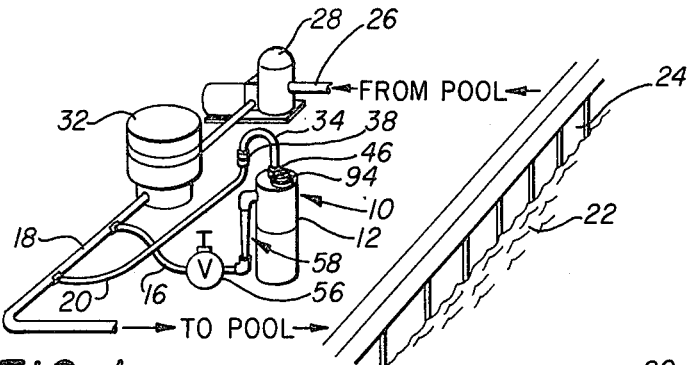
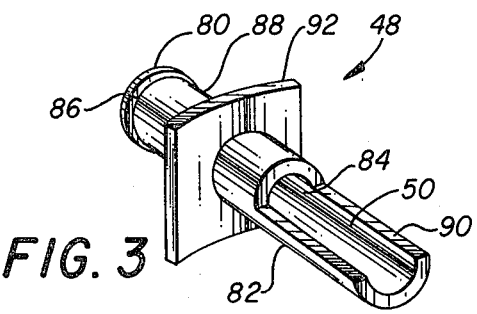
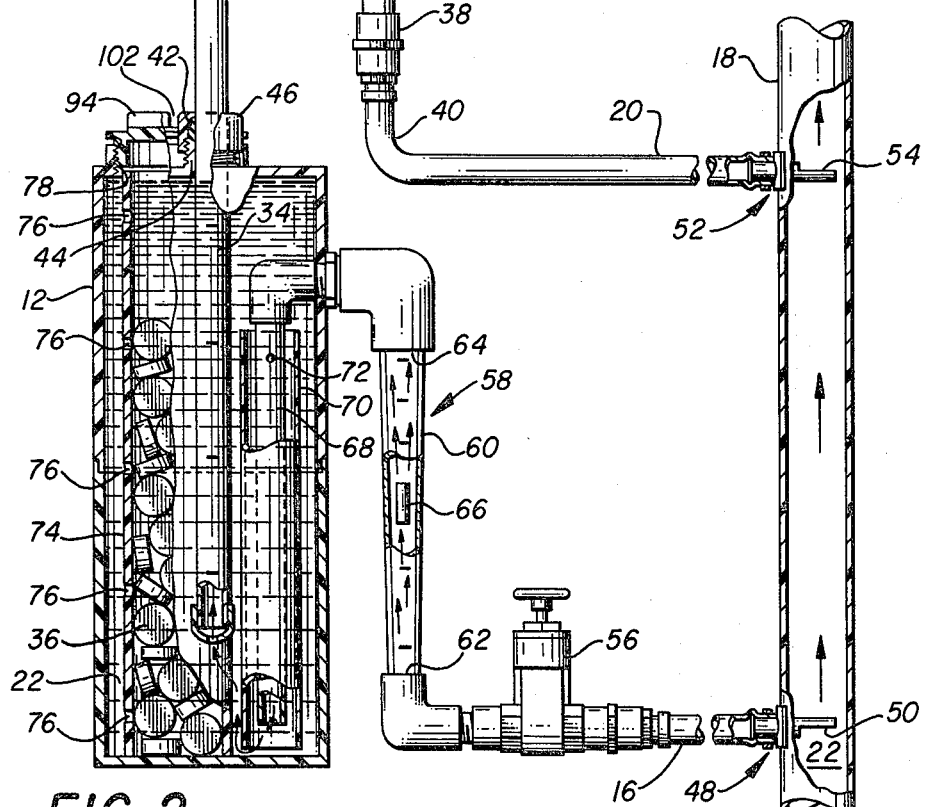

IN-LINE APPARATUS FOR DISSOLVING A SOLID IN A LIQUID

BACKGROUND OF THE INVENTION

1. Field of the Invention

The present invention relates generally to apparatus for dissolving solids in liquids, and in one of its aspects, to a chlorinator for dissolving chlorine solids in water for swimming pools.

2. Description of the Prior Art

Adding chlorine to swimming pool water is highly desirable in order to prevent the buildup of fungus and bacteria in the water. In the past, those in charge of swimming pool maintenance would dump liquid chlorine directly into the pool on a periodic basis or as determined by various checking procedures. Over the years, the demand for an automated way of chlorinating swimming pool water increased leading to the development of pool chlorinators or "feeders."

A conventional pool chlorinator includes a tank for holding chlorine solids usually in the form of chlorine tablets, an intake line connecting the water line at the high pressure side of the pump to the tank, and a return line connecting the tank to the water line on the low pressure side of the pump. The difference in pressure between the high pressure side of the pump and the low pressure side of the pump forces the water through the tank over the exposed surface of the clorine solids, dissolving the solids. A ball cock type mechanism is frequently used to control the water level within the tank, the ball cock valve shutting off the intake line when a certain water level is reached within the tank. Frequently, the tablets are inserted into the tank in an enclosed plastic container. The user in supposed to punch holes in the container to allow the water to circulate through the container over the exposed surface of the chlorine tablets. The rate at which the chlorine tablets are dissolved is partially dependent upon the number and height of the holes punched in the tablet container.

A number of problems arise with the use of a conventional chlorinator. One serious problem is caused by the return line returning the water from the tank to the water line on the low pressure side of the pump. This arrangement causes water with a high concentration of chlorine to be pumped through the pump and filter causing serious corrosion of both. Further, because of the relatively fixed water level within the tank and the fixed size of the chlorine tablet container, the rate of dissolving the chlorine solids cannot be adjusted over a large range. There is, therefore, no way to make allowances for different pool sizes and conditions using a single size chlorinator except for the small adjustments that can be made to the ball cock or in the holes made in the chlorine tablet container. The efficiency of the conventional chlorinator is also limited since the intake to the chlorinator is taken from the most heavily chlorinated water in the water line, the intake line connecting to the water line downstream of the return line.

SUMMARY OF THE INVENTION

The present invention concerns an apparatus for dissolving a solid in a liquid flowing in a liquid line. The apparatus is especially well adapted for use as a chlorinator for dissolving chlorine solids such as chlorine tablets in water flowing in a water line. An apparatus according to the present invention includes a tank for holding the solid to be dissolved, an intake line connecting the liquid line in fluid communication with the tank for bringing liquids from the liquid line into the tank, and a return line connecting the tank in fluid communication with the liquid line for returning the liquid from the tank into the liquid line. The tank end of the return line is inserted an adjustable depth into the tank so that the liquid passes through the tank from the intake line to the return line over the exposed surface of the solid, dissolving the solid. The rate of dissolving the solid can be adjusted by adjusting the depth of the tank end of the return line. Adjusting the depth of the tank end of the return line adjusts the water flow across the solids, which determines how much of the chlorine solid will be exposed to rapid erosion. The downwardly extending portion of the return line comprises an inverted J-shaped pipe in one embodiment.

An intake connector terminates the liquid line end of the intake line. The intake connector extends into the liquid line and forms an opening facing upstream so that water is forced into the opening and the intake line. A return connector terminates the liquid line end of the return line. The return connector extends into the liquid line and forms an opening facing downstream which gives a venturi suction effect.

One embodiment of the apparatus of this invention also includes a hand operable valve connected in-line with the intake line for adjusting the flow rate of liquid through the tank, and a flow meter connected in-line with the intake line for indicating the flow rate of the liquid through the tank. The flow meter includes a substantially transparent downwardly tapered conduit forming a seated inlet near the bottom of the conduit and forming an outlet near the top of the conduit. An indicator in the conduit rests on the seated inlet when no water is flowing through the intake line, and is displaced from the seated inlet by the force of liquid moving from the inlet to the outlet when liquid is flowing. When liquid is not flowing in the main liquid line, or is flowing in the reverse direction, the indicator is forced against the seated inlet, acting as a check valve to prevent reverse flow through the tank.

In a preferred embodiment of an apparatus according to the present invention, the tank end of the intake line extends downwardly into the tank, and a substantially vertical pipe, resting on the bottom of the tank encircles the downwardly extending portion of the intake line from the bottom of the tank substantially to the top of the downwardly extending portion of the intake line. The wall of the intake line forms at least one hole below the top of the encircling pipe for venting air out of the line.

A chlorinator according to the present invention includes a substantially vertical cartridge pipe which rests on the bottom or the tank for retaining chlorine tablets, such as trichloro-s-triazinetrione chlorinating tablets. The cartridge pipe forms a plurality of apertures along the length of the pipe to allow water to flow through the pipe over the exposed surface of the chlorine tablets. The tank forms a threaded orifice near the top of the cartridge pipe for receiving chlorine tablets so that chlorine tablets can be placed into the cartridge pipe through the orifice. The cartridge pipe is removable so that the entire tank can be used to hold chlorine tablets for large pools.

A special threaded lid for closing the threaded orifice includes a means for receiving a tool shaft across the top of the lid so that the lid can be turned within the threaded orifice by placing the tool shaft into the receiving means and applying force to the tool handle in a direction transverse to the shaft and the axis of rotation of the lid. This allows the use of any tool that would normally be convenient to a home pool owner, such as a screwdriver, for gaining access to the tank for replenishing the supply of chlorine tablets. The lid thus acts in concert with the other features of this invention to make a chlorinator which is easily operated by the nonprofessional. A preferred embodiment of a means for receiving a tool shaft across the top of the lid is a groove at least substantially as deep as the thickness of the tool shaft, the groove running across the top of the lid. In one arrangement, the at least one groove comprises two grooves at right angles, intersecting near the center of the lid.

These and other objects, advantages and features of this invention will be apparent from the following description taken with reference to the accompanying drawings, wherein is shown the preferred embodiments of the invention.

BRIEF DESCRIPTION OF THE DRAWING

FIG. 1 is a pictorial representation of an apparatus according to the present invention being used as a chlorinator for a swimming pool;

FIG. 2 is a partial cross-sectional view of a chlorinator in accordance with the present invention;

FIG. 3 is a perspective view of a connector for interfacing a chlorinator with a water line in accordance with the present invention;

DETAILED DESCRIPTION

Figure 4:
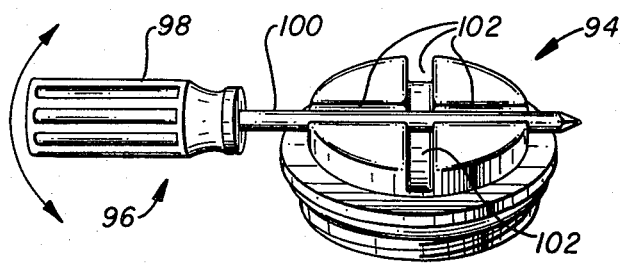
FIG. 4 is an isometric view of a lid in accordance with the present invention being turned by a tool.

Referring now to the drawings, a chlorinator according to the present invention is referred to generally by reference numeral 10. Chlorinator 10 chlorinates water 22 of a pool 24. Water 22 is pumped from pool 24 through low pressure water line 26 by pump 28. Pump 28 pumps the water through high pressure water line 30. Water 22 is also pumped through an in-line filter 32 for cleaning the water. Chlorinator 10 is connected in-line in high pressure water line 18 for adding chlorine to water 22 while it is in water line 18.

Chlorinator 10 includes a tank 12 for holding chlorine tablets 14 such as trichloro-s-triazinetrione chlorinating tablets, an intake line 16 connecting a water line 18 in fluid communication with tank 12 for bringing water from the water line into the tank, and a return line 20 connecting tank 12 in fluid communication with water line 18 for returning water from the tank into the water line.

Tank end 34 of return line 20 is inserted an adjustable depth into tank 12. Water passes through tank 12 from intake line 16 to return line 20 over the exposed surface 36 of chlorine tablets 14, dissolving the chlorine tablets. The rate of dissolving the chlorine tablets can be adjusted by adjusting the depth of tank end 34 of return line 20. A preferred embodiment of tank end 34 of return line 20 is an inverted J-shaped pipe and a joint 38 for connecting a flexible portion 40 of return line 20 to inverted J-shaped pipe 34, flexible portion 40 hanging in a downward direction from joint 38. The use of inverted J-shaped pipe 34 diminishes the likelihood of crimping flexible portion 40. The depth of inverted J-shaped pipe 34 in tank 12 determines the flow of water 22 within the tank and, thus, the amount of rapid erosion surface 36 of chlorine tablets 14. Inverted J-shaped pipe 34 is held in place by rubber retainer 42 which rests on a seating 44 formed by tank 12. Once rubber retainer 42 is adjusted to the proper position on inverted J-shaped pipe 34, rubber retainer 42 and J-shaped pipe 34 are held in place by a slip nut 46. Chlorinator 10 also includes an intake connector 48 terminating water line 18 end of intake line 16. Intake connector 48 extends into water line 18 and forms an opening 50 facing upstream. Chlorinator 10 also includes a return connector 52 terminating water line 18 end of return line 20. Return connector 52 extends into water line 18 and forms an opening 54 facing downstream.

A preferred embodiment of chlorinator 10 also includes a hand operable valve 56 connected in line with intake line 16 for adjusting the flow rate of water 22 through tank 12, and a flow meter 58 connected in line with intake line 16 for indicating the flow rate of water 22 through tank 12. Flow meter 58 comprises a substantially transparent downwardly tapered conduit 60 forming a seated inlet 62 near the bottom of the conduit and forming an outlet 64 near the top of the conduit, and an indicator 66 in conduit 60 restable on seated inlet 62 and displaceable therefrom by the force of water 22 moving from inlet 62 to outlet 64. Tank end 68 of intake line 16 extends downwardly into tank 12. Chlorinator 10 also includes a substantially vertical pipe 70 extending from the bottom of the tank substantially to the top of the downwardly extending portion 68 of intake line 16 encircling the downwardly extending portion of the intake line. Pipe 70 is restable on the bottom of tank 12, and is preferably of a light construction so that water 22 easily flows underneath it so that pipe 70 acts as a splash baffle for water coming into the tank from intake line 16. The wall of intake line 16 forms at least one hole 72 below the top of encircling pipe 70. At least one hole 72 allows the venting of at least some of the air from intake line 16 before the water exits from the bottom of downwardly extending portion 68.

Chlorinator 10 further includes a substantially vertical cartridge pipe 74 restable on the bottom of tank 12 for retaining chlorine tablets 14. Cartridge pipe 74 forms a plurality of apertures 76 along the length of the pipe. Apertures 76 allow the flow of water across the exposed surface 36 of chlorine tablets 14 no matter what water level is set by adjusting the depth of inverted J-shaped pipe 34. Cartridge pipe 74 is preferably of a heavier construction than encircling pipe 70 in order to prevent too much water and tablet flow beneath the cartridge pipe. A preferred construction material for both cartridge pipe 74 and encircling pipe 70, as well as inverted J-shaped pipe 34 and tank 12, is a thermoplastic such as used for plastic plumbing pipes. Polyvinyl chloride pipes and joints are suitable for constructing much of a chlorinator according to the present invention. Tank 12 forms an orifice 78 near the top of cartridge pipe 74 for receiving chlorine tablets 14 so that chlorine tablets can be placed into cartridge pipe 74 through orifice 78.

Referring now to FIG. 3, an intake connector 48 includes a means 80 for connecting connector 48 to intake line 16, and a portion 82 extending into water line 18 so joined to connecting means 80 that the extending portion and connecting means have a continuous passage 84 therethrough. Means 80 for connecting to intake line 16 includes a lip 86 and a neck 88 so that, if intake line 16 is made of a flexible material, intake line 16 can be pulled up on neck 88 and held in place by lip 86. Extending portion 82 forms opening 50 for facing upstream. In a preferred embodiment of connector 48, extending portion 82 comprises a pipe for extending transversely to water line 18, the opening 50 being a substantially longitudinal cutaway 90 from the pipe. A preferred form of connector 48 also includes a contoured stop 92 extending outwardly from connecting means 80 and extending portion 82 for holding connector 48 in place in water line 18. The contour of 92 preferably fits the contour of water line 18 for helping keep the opening facing in the proper direction. Return connector 52 is of construction similar to that of intake connector 48.

Referring now to FIG. 4, chlorinator 10, in a preferred embodiment, includes a threaded lid 94 to be used in conjunction with a tool such as a screwdriver 96 having a handle 98 and a shaft 100. Lid 94 includes a means such as at least one groove 102 for receiving tool shaft 100 across the top of the lid. Orifice 78 formed by tank 12 is threaded for engaging threaded lid 94 so that lid 94 can be turned within threaded orifice 78 by placing tool shaft 100 into at least one groove 102 and applying force to tool handle 98 in a direction transverse to the shaft and the axis of rotation of the lid. A preferred embodiment of lid 94 is constructed of molded plastic.

Figure 5:
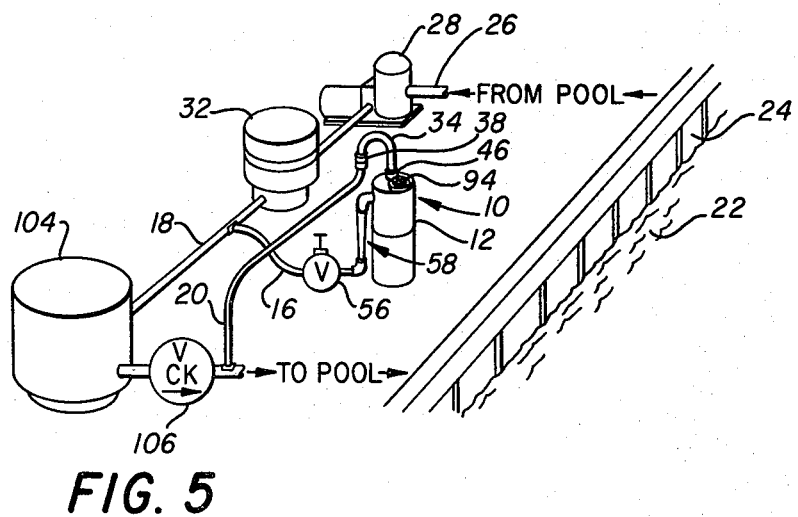
FIG. 5 is a pictorial representation similar to that of FIG. 1 for a swimming pool with a heater.

Referring to FIG. 5, a pool 24 includes a heater 104 connected in-line in water line 18. A preferred connection of chlorinator 10 is to connect intake line 16 upstream of heater 104 and to connect return line 20 downstream of heater 104. In such an arrangement, water is not passed through the chlorinator immediately after heating and water is not passed through the heater immediately after chlorinating, reducing the damage done to both heater and chlorinator. A check valve 106 should be connected between heater 104 and return line 20 to prevent back flow from chlorinator 10 to heater 104. A preferred connection of chlorinator 10 in pools with pumps that run on timers rather than continuously is to include a check valve in-line in water line 18 between intake line 16 and return line 20.

Although a specific embodiment of a pool chlorinator has been disclosed, many of the principles disclosed are generally applicable to an apparatus for dissolving a solid in a liquid flowing in a liquid line as more fully defined in the claims.

As can now be seen, the current invention overcomes many of the problems encountered with conventional chlorinators. Both its intake line and return line can be connected on the high pressure side of the pump so that a high concentration of chlorine is not pumped through the pump and the filter. The rate at which chlorine tablets are dissolved can be varied widely by varying the water level within the tank by changing the depth of the inverted J-shaped pipe, varying the flow rate through the tank by adjusting the hand operable valve and by the use of the cartridge pipe for containing the chlorine tablets or by removing the cartridge pipe and using the entire tank as a cartridge holder. The chlorinator of this invention can thus be used for a large range of pool sizes and conditions. A chlorinator according to the present invention is very efficient since the return line can be connected downstream of the intake line so that the least chlorinated water in the water line is run through the chlorinator.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for dissolving a solid in a liquid flowing in a liquid line, comprising in combination:
    a tank for holding the solid to be dissolved;
    an intake line for connecting the liquid line in fluid communication with the tank for bringing liquid from the liquid line into the tank wherein the tank end of the intake line extends downwardly into the tank;
    a return line for connecting the tank in fluid communication with the liquid line for returning the liquid from the tank into the liquid line wherein the tank end of the return line is inserted an adjustable depth into the tank whereby liquid passes through the tank from the intake line to the return line over the exposed surface of the solid, dissolving the solid and the rate of dissolving the solid can be adjusted by adjusting the depth of the tank end of the return line; and
    a substantially vertical pipe extending from the bottom of the tank substantially to the top of the downwardly extending portion of the intake line encircling the downwardly extending portion of the intake line, restable on the bottom of the tank, the wall of the intake line forming at least one hole below the top of the encircling pipe.

2. An apparatus according to claim 1 further including:
    an intake connector terminating the liquid line end of the intake line, the intake connector for extending into the liquid line and forming an opening for facing upstream; and
    a return connector terminating the liquid line end of the return line, the return connector for extending into the liquid line and forming an opening for facing downstream.

3. An apparatus according to claim 1 further comprising:
    a hand operable valve connected in-line with the intake line for adjusting the flow rate of liquid through the tank; and
    a flow meter connected in-line with the intake line for indicating the flow rate of the liquid through the tank, the flow meter comprising a substantially transparent downwardly tapered conduit forming a seated inlet near the bottom of the conduit and forming an outlet near the top of the conduit, and an indicator in the conduit restable on the seated inlet and displaceable therefrom by the force of liquid moving from the inlet to the outlet.

4. An apparatus according to claim 1 for dissolving chlorine tablets in water further comprising a substantially vertical cartridge pipe restable on the bottom of the tank for retaining chlorine tablets, the cartridge pipe forming a plurality of apertures along the length of the pipe wherein the tank forms an orifice near the top of the cartridge pipe for receiving chlorine tablets whereby chlorine tablets can be placed into the cartridge pipe through the orifice.

5. An apparatus according to claim 4 to be used in conjunction with a tool having a handle and a shaft, further comprising a threaded lid including a means for receiving the tool shaft across the top of the lid wherein the orifice formed by the tank is threaded for engaging the threaded lid whereby the lid can be turned within the threaded orifice by placing the tool shaft into the receiving means and applying force to the tool handle in a direction transverse to the shaft and the axis of rotation of the lid.

6. An apparatus for dissolving a solid in a liquid flowing in a liquid line, comprising in combination:
   a tank for holding the solid to be dissolved;
   an intake line for connecting the liquid line in fluid communication with the tank wherein the tank end of the intake line extends downwardly into the tank;
   an intake connector terminating the liquid line end of the intake line, the intake connector for extending into the liquid line and forming an opening for facing upstream;
   a return line for connecting the tank in fluid communication with the liquid line;
   a return connector terminating the liquid line end of the return line, the return connector for extending into the liquid line and forming an opening for facing downstream; and
   a substantially vertical pipe extending from the bottom of the tank substantially to the top of the downwardly extending portion of the intake line encircling the downwardly extending portion of the intake line, restable on the bottom of the tank, the wall of the intake line forming at least one hole below the top of the encircling pipe.

7. An apparatus according to claim 6 further comprising:
   a hand operable valve connected in-line with the intake line for adjusting the flow rate of liquid through the tank; and
   a flow meter connected in-line with the intake line for indicating the flow rate of the liquid through the tank, the flow meter comprising a substantially transparent downwardly tapered conduit forming a seated inlet near the bottom of the conduit and forming an outlet near the top of the conduit, and an indicator in the conduit restable on the seated inlet and displaceable therefrom by the force of liquid moving from the inlet to the outlet.

8. An apparatus according to claim 6 for dissolving chlorine tablets in water further comprising a substantially vertical cartridge pipe restable on the bottom of the tank for retaining chlorine tablets, the cartridge pipe forming a plurality of apertures along the length of the pipe wherein the tank forms an orifice near the top of the cartridge pipe for receiving chlorine tablets whereby chlorine tablets can be placed into the cartridge pipe through the orifice.

9. An apparatus according to claim 8 to be used in conjunction with a tool having a handle and a shaft, further comprising a threaded lid including means for receiving the tool shaft across the top of the lid wherein the orifice formed by the tank is threaded for engaging the threaded lid whereby the lid can be turned within the threaded orifice by placing the tool shaft into the receiving means and applying force to the tool handle in a direction transverse to the shaft and the axis of rotation of the lid.

* * * * *